United States Patent
Salter et al.

(10) Patent No.: US 10,641,452 B2
(45) Date of Patent: May 5, 2020

(54) VEHICLE ILLUMINATION SYSTEM HAVING A LENS WITH A SAWTOOTH PROFILE

(71) Applicant: Ford Global Technologies, LLC, Dearborn, MI (US)

(72) Inventors: Stuart C. Salter, White Lake, MI (US); David Brian Glickman, Southfield, MI (US); Paul Kenneth Dellock, Northville, MI (US); Cornel Lewis Gardner, Romulus, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 73 days.

(21) Appl. No.: 16/108,247

(22) Filed: Aug. 22, 2018

(65) Prior Publication Data
US 2020/0063937 A1    Feb. 27, 2020

(51) Int. Cl.
*B60Q 1/24*     (2006.01)
*F21S 41/275*   (2018.01)
*F21S 41/141*   (2018.01)

(52) U.S. Cl.
CPC .............. *F21S 41/275* (2018.01); *B60Q 1/24* (2013.01); *F21S 41/141* (2018.01)

(58) Field of Classification Search
CPC . F21V 5/02; F21V 5/045; F21V 5/005; F21V 5/007; B60Q 1/24; B60Q 1/323; F21S 41/151; F21S 41/142; F21S 41/141
USPC ....... 362/495, 520, 521, 522, 545, 240, 244, 362/311.02, 339
See application file for complete search history.

(56) References Cited

U.S. PATENT DOCUMENTS

| | | | | |
|---|---|---|---|---|
| 4,652,979 A | * | 3/1987 | Arima | F21S 43/26 362/522 |
| 4,722,023 A | * | 1/1988 | Arima | B60Q 1/302 362/309 |
| 6,097,549 A | * | 8/2000 | Jenkins | B60Q 1/302 359/726 |
| 7,148,313 B2 | | 12/2006 | Koga et al. | |
| 7,290,908 B2 | * | 11/2007 | Amano | F21S 43/14 362/520 |
| 7,527,405 B2 | * | 5/2009 | Tatsukawa | F21S 41/13 362/538 |
| 8,258,704 B2 | | 9/2012 | Brant | |
| 8,587,199 B2 | | 11/2013 | Hamazu et al. | |
| 9,855,888 B1 | | 1/2018 | Dellock et al. | |

(Continued)

FOREIGN PATENT DOCUMENTS

EP    3081543 A1    10/2016

OTHER PUBLICATIONS

Willits Power and Hardware, Continues—US Underglow Plug-In LED Under Cabinet Light Tape—UG80WW, Retrieved on Jul. 13, 2018, from www.willitspower.doitbest.com/products/500014.

*Primary Examiner* — Ismael Negron
(74) *Attorney, Agent, or Firm* — David Coppielli; Carlson, Gaskey & Olds, P.C.

(57) ABSTRACT

An illumination system includes a light source that is fixed to a vehicle mount structure to direct light toward ground level. A lens covers the light source and includes an outer surface with a sawtooth profile. The sawtooth profile includes a plurality of teeth that are spaced apart from each other by flat surfaces, and wherein each light is generally aligned with a flat surface between adjacent teeth.

23 Claims, 3 Drawing Sheets

(56) References Cited

U.S. PATENT DOCUMENTS

| | | | |
|---|---|---|---|
| 2005/0068785 A1* | 3/2005 | Takeda | B60Q 1/323 362/506 |
| 2008/0100023 A1* | 5/2008 | Ross | B60R 3/002 280/166 |
| 2012/0280528 A1* | 11/2012 | Dellock | B60R 1/06 296/1.08 |
| 2013/0003370 A1* | 1/2013 | Watanabe | F21S 8/086 362/244 |
| 2015/0036340 A1* | 2/2015 | Schwaighofer | F21V 5/08 362/236 |
| 2016/0290586 A1 | 10/2016 | Shido et al. | |
| 2018/0118101 A1 | 5/2018 | Salter et al. | |
| 2019/0301705 A1* | 10/2019 | Schickel | F21S 41/24 |

\* cited by examiner

VEHICLE ILLUMINATION SYSTEM HAVING A LENS WITH A SAWTOOTH PROFILE

TECHNICAL FIELD

This disclosure relates to a method and apparatus for ground effect lighting.

BACKGROUND

Illumination systems used in vehicles can offer attractive viewing experiences. For example, puddle lamps have been utilized to illuminate a beam of light onto a ground surface in an area adjacent to the vehicle door when the door is to be opened. Thus, it is desirable to provide even more enhanced lighting applications by incorporating additional illumination systems in unique portions of the vehicle to provide accent as well as functional lighting.

SUMMARY

An apparatus according to an exemplary aspect of the present disclosure includes, among other things, a light source fixed to a vehicle mount structure to direct light toward ground level, and a lens covering the light source, wherein the lens includes an outer surface having a sawtooth profile.

In a further non-limiting embodiment of the foregoing apparatus, the outer surface comprises a textured surface.

In a further non-limiting embodiment of any of the foregoing apparatus, the textured surface comprises a plurality of nibs protruding outwardly from the outer surface of the lens.

In a further non-limiting embodiment of any of the foregoing apparatus, the nibs are spaced apart from each other by a predetermined distance and cover an entirety of the outer surface of the lens.

In a further non-limiting embodiment of any of the foregoing apparatus, the lens is comprised of a polypropylene/TPO resin material.

In a further non-limiting embodiment of any of the foregoing apparatus, the sawtooth profile includes a plurality of teeth that are spaced apart from each other by a flat surface.

In a further non-limiting embodiment of any of the foregoing apparatus, each tooth includes a front face that faces a vehicle forward direction and a rear face that faces a vehicle rearward direction, and wherein the front face is slanted relative to the rear face.

In a further non-limiting embodiment of any of the foregoing apparatus, the front face extends from a first location at the flat surface to second location at a distal tip and the rear face extends from the distal tip to the flat surface to form one tooth, and wherein the front face slants in a rearward direction such that the second location is rearward of the first location.

In a further non-limiting embodiment of any of the foregoing apparatus, the rear face is perpendicular to the flat surface.

In a further non-limiting embodiment of any of the foregoing apparatus, the apparatus includes a base layer and a printed circuit board fixed to the base layer, and wherein the light source comprises a plurality of lights that are attached to the printed circuit board, and wherein the lens is molded over the lights.

In a further non-limiting embodiment of any of the foregoing apparatus, the vehicle mount structure comprises a rocker panel, and including a base to which the light source and lens are attached to form a light assembly, and wherein the light assembly is mounted on a ground facing surface of the rocker panel.

Another example of an apparatus according to an exemplary aspect of the present disclosure includes, among other things, a base supporting a printed circuit board, at least one light connected to the printed circuit board, and a lens covering the light to provide a light assembly, wherein the lens includes an outer surface having a sawtooth profile, and wherein the outer surface comprises a textured surface.

In a further non-limiting embodiment of any of the foregoing apparatus, the light assembly is attached to a vehicle mount structure such that light from the light assembly is directed toward ground level.

In a further non-limiting embodiment of any of the foregoing apparatus, the vehicle mount structure comprises a rocker panel, and wherein the light assembly is mounted on a ground facing surface of the rocker panel.

In a further non-limiting embodiment of any of the foregoing apparatus, the textured surface comprises a plurality of nibs protruding outwardly from a base surface of the lens.

In a further non-limiting embodiment of any of the foregoing apparatus, the lens is comprised of a polypropylene/TPO resin material that is molded over the lights and printed circuit board.

In a further non-limiting embodiment of any of the foregoing apparatus, the sawtooth profile includes a plurality of teeth that are spaced apart from each other by a flat surface, and wherein each tooth includes a front face that faces a vehicle forward direction and a rear face that faces a vehicle rearward direction, and wherein the front face extends from a first location at the flat surface to second location at a distal tip and the rear face extends from the distal tip to the flat surface to form one tooth, and wherein the front face slants in a rearward direction such that the second location is rearward of the first location, and wherein the rear face is perpendicular to the flat surface.

A method according to another exemplary aspect of the present disclosure includes, among other things, fixing a light assembly to a ground facing surface of a rocker panel to provide ground effect lighting, and providing the light assembly with a lens that has an outer surface having a sawtooth profile.

In a further non-limiting embodiment of the foregoing method, the method includes providing the outer surface as a textured surface that covers an entirety of the lens.

In a further non-limiting embodiment of any of the foregoing methods, the method includes forming the lens from a polypropylene/TPO resin material that is molded over lights of the light assembly.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure describes a method and apparatus of providing a light assembly that is fixed to a vehicle mount structure to direct light toward ground level.

Figure 1:
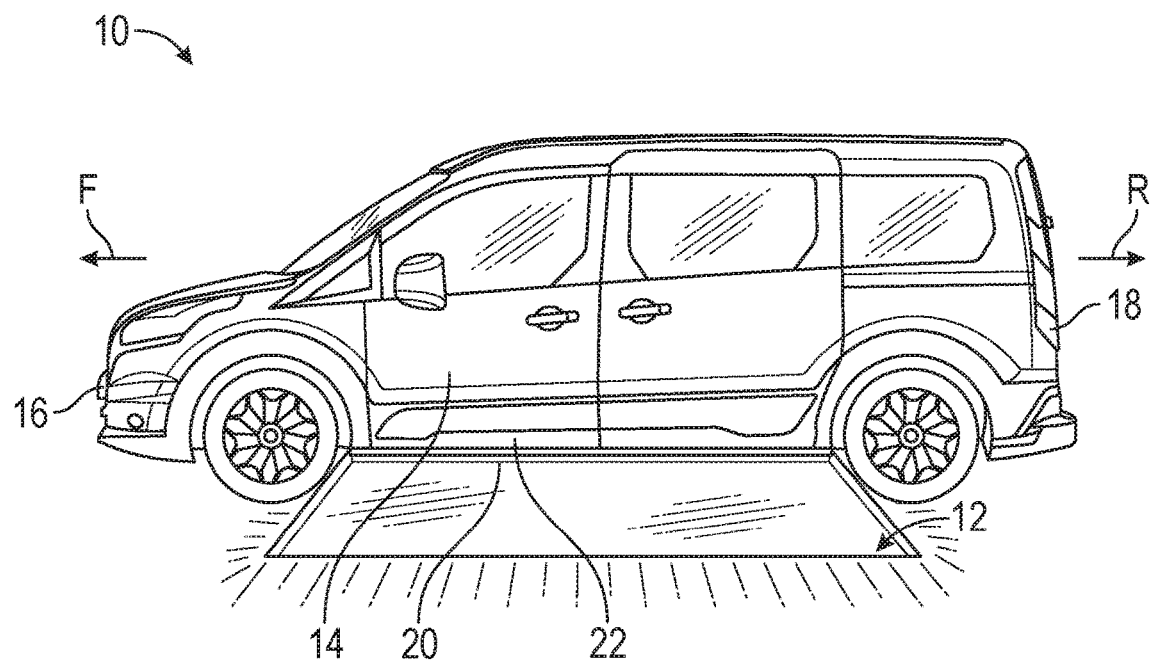
FIG. 1 shows a vehicle incorporating the subject invention in an illumination system that provides ground effect lighting.

FIG. 1 shows an example of a vehicle 10 having an illumination system 12 that provides ground effect lighting. The light is projected approximately one to two feet outwardly from a side panel 14 of the vehicle 10. While not shown, the illumination system 12 can also project light outwardly from a front 16 of the vehicle and from a rear 18 of the vehicle. In one example, lights from the illumination system 12 are mounted to a ground facing surface 20 of a rocker panel 22.

Figure 2:
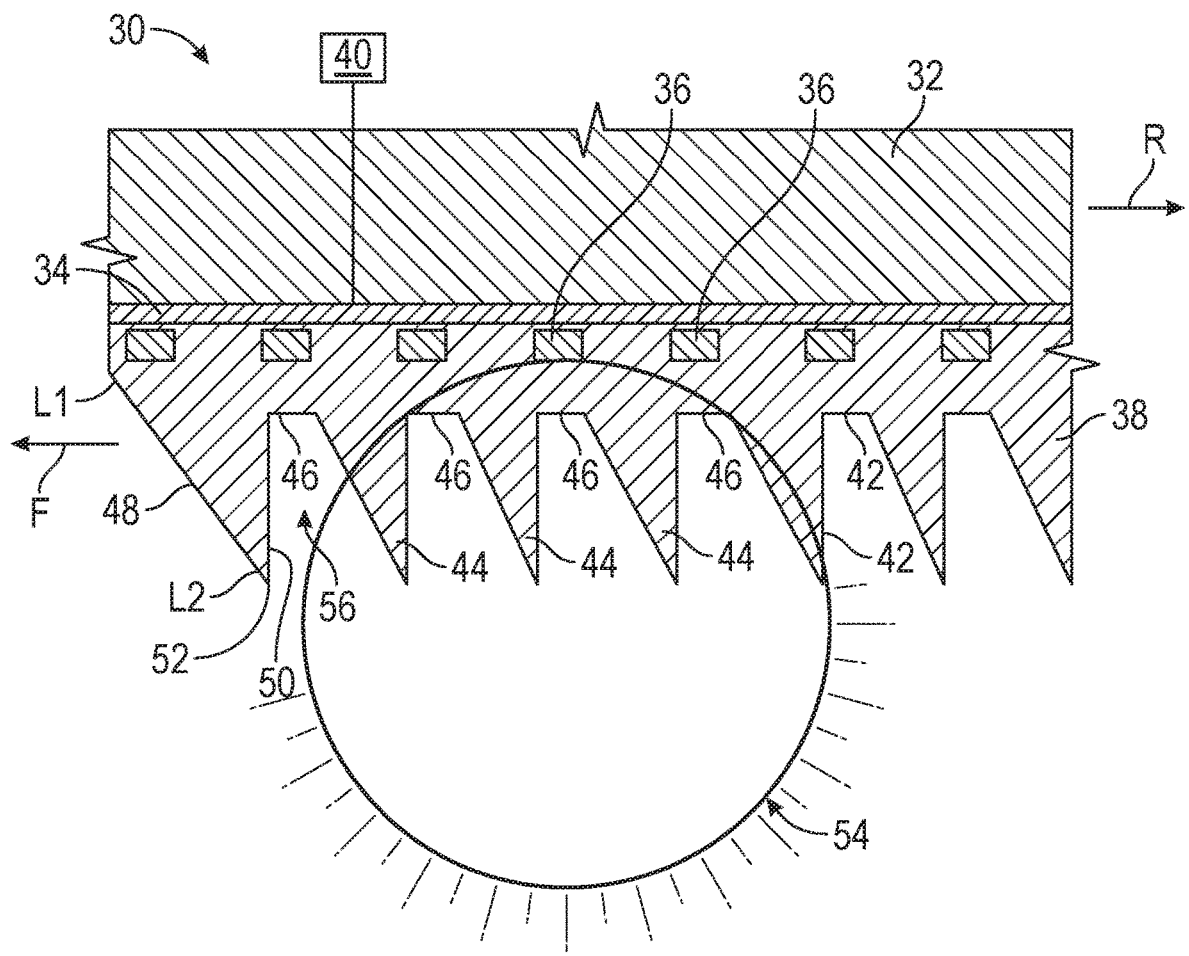
FIG. 2 is a schematic representation of a light assembly as used in the illumination system of FIG. 1, wherein a radiation pattern of light is shown.
Figure 3:
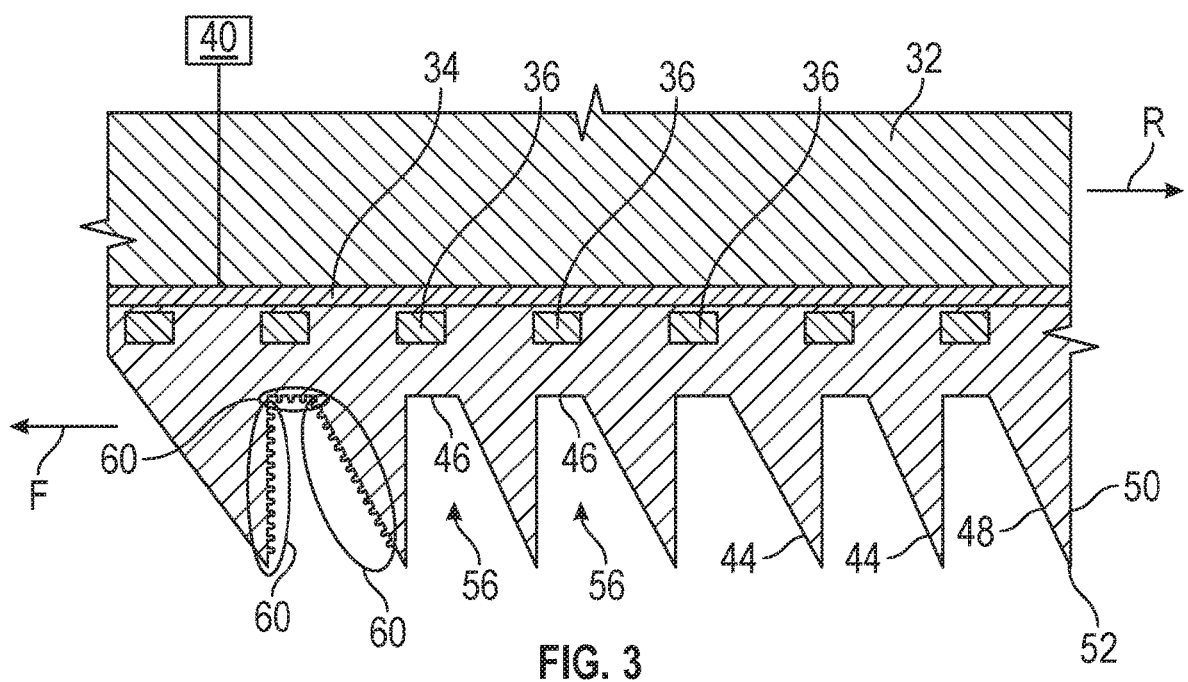
FIG. 3 is similar to FIG. 2 but without the radiation pattern of light.
Figure 4:
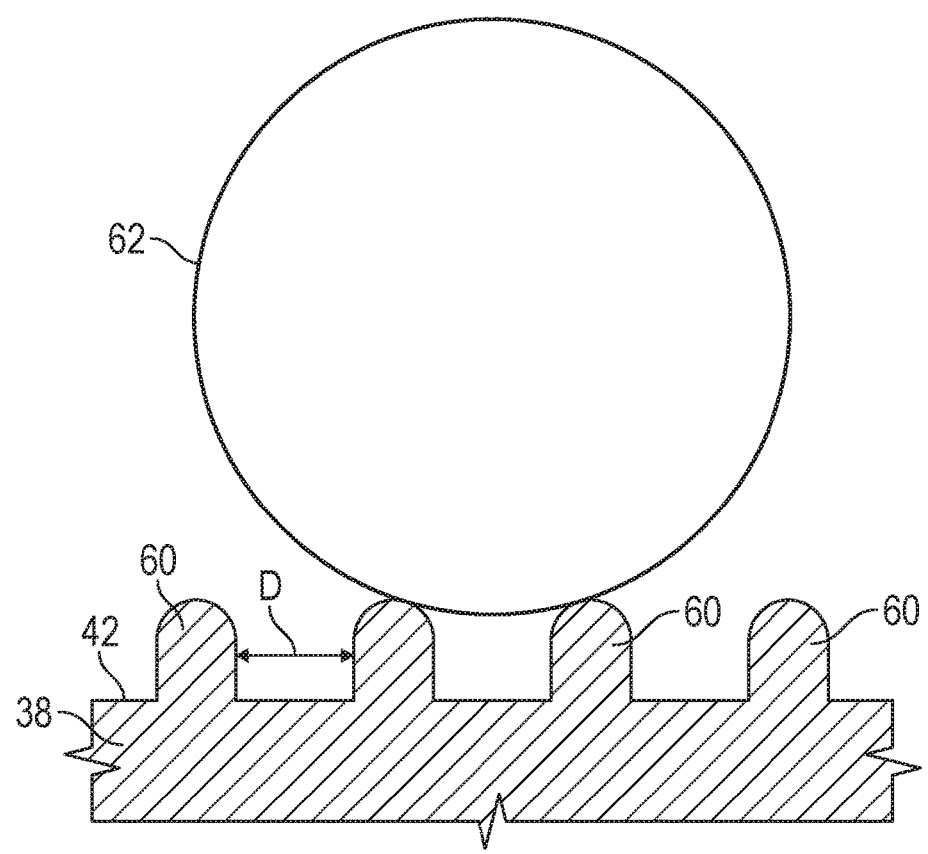
FIG. 4 is a magnified view of a surface of a lens from the light assembly of FIGS. 2-3.
Figure 5:
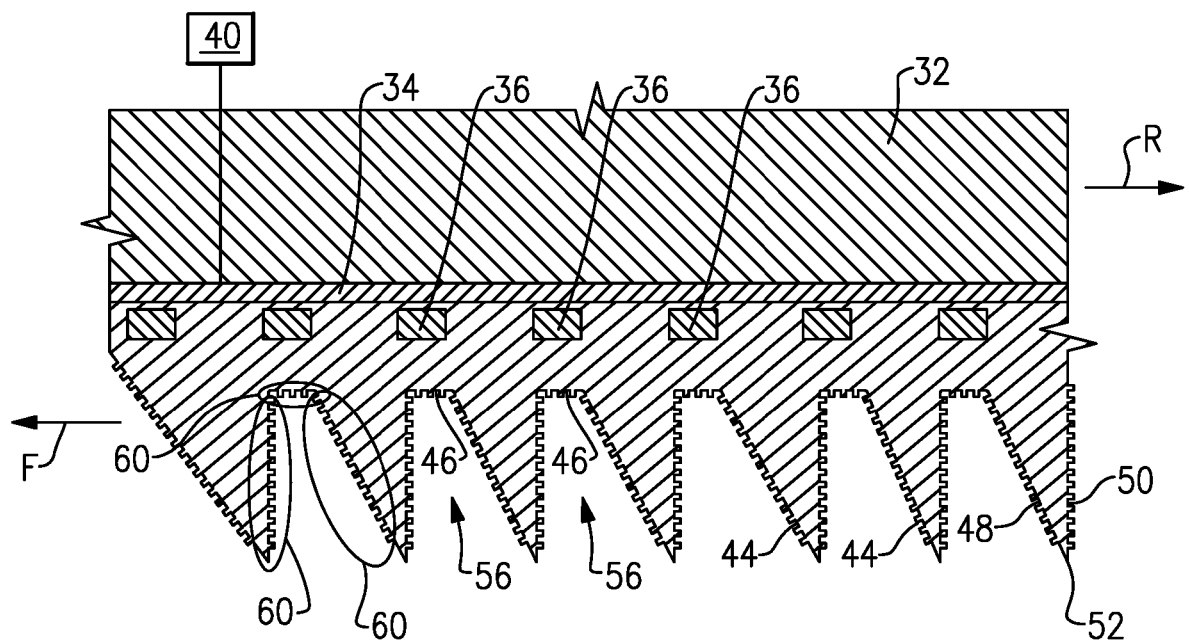
FIG. 5 is the same as FIG. 3 but shows nibs that cover an entirety of an outer surface of the lens.

One example of a light assembly 30 from the illumination system 12 is shown in FIGS. 2-4. The light assembly 30 includes a base 32 or base layer of material, a printed circuit board 34, one or more lights 36 or light sources, and a lens 38 that are assembled together as a unit to be mounted to the rocker panel 22. In one example the base 32 is comprised of a plastic material that provides sufficient compression/flexibility such that the light assembly can handle impact loading due to rocks or other debris that may be directed against the ground facing surface 20 of the rocker panel 22.

The printed circuit board 34 comprises a flex printed circuit, thin FR4, or any other suitable circuit that is molded to, other otherwise attached to, the base 32. The lights 36 are connected to the printed circuit board 34 in a desired configuration to provide the desired light output. In one example, the lights comprise LEDs that provide a 120 degree radiation and have a size that is approximately 3.5×3.7 mm other types of light sources could also be used. The printed circuit board 34 is connected to power supply and control unit 40. The power supply and control unit 40 operates in a known manner to control when the lights 36 are to be activated.

Because the light assembly 30 is mounted on the ground facing surface 20 of the rocker panel 22, there are challenges that must be addressed such as, for example, objects impacting the light assembly 30 in a destructive manner and dirt covering the lens 38 which reduces light output. The solution to keeping the lens 38 clean involves both geometry and materials. The geometric solution involves providing an outer surface 42 of the lens 38 with a sawtooth profile or pattern. The sawtooth profile includes a plurality of teeth 44 that are spaced apart from each other by flat surfaces 46. Each tooth 44 includes a front face 48 that faces a vehicle forward direction F and a rear face 50 that faces a vehicle rearward direction R.

In one example, the front face 48 is slanted relative to the rear face 50. The front face 48 extends from a first location L1 at the flat surface 46 to second location L2 at a distal tip 52. The rear face 50 extends from the distal tip 52 to the flat surface 46. The front face 48 slants in a rearward direction such that the second location L2 is rearward of the first location L1. In one example, the front face 48 slants at a 45 degree angle relative to the flat surface 46. In one example, the rear face 50 is perpendicular to the flat surface 46. These angles can be varied as needed to satisfy light output requirements.

In one example, each light 36 is generally aligned with a flat surface 46 between adjacent teeth 44. FIG. 2 shows a LED radiation pattern 54 for one such light 36. The most intense part of the light pattern 54 hits the flat surface 46 for good light emission. In one example, the flat surface 46 is 4 mm across between adjacent teeth 44 and the rear face 50 is 10-15 mm in height. This allows the LED light 36 to exit maximum light down towards the ground G (FIG. 1). These dimensions could be adjusted dependent on styling, performance, and dirt/debris testing.

The sawtooth pattern primarily protects the areas of the flat surfaces 46 and the rear face 50. The front face 48, which is slanted rearwardly, opens up a groove 56 or open area behind each tooth 44. This slanted design helps to prevent the area of the grooves 56 from being packed up with dirt or snow.

The material solution to keeping the lens 38 clean involves providing a material that will keep ice from forming on the outer surface 42 of the lens 38 and that will create a super hydrophobic surface so that water easily sheds from the lens surface. As such, the lens 38 is molded from a material with low surface energy and with nano-scale hydrophobic features formed onto the surface of each tooth 44 and flat surface 46 to create a non-stick surface that sheds water and ice. In one example, the lens 38 is molded from polypropylene/TPO (thermoplastic olefin) resin material. This material has high impact resistance, low density, good chemical resistance, and lower surface energy, which helps to repel water from the surface.

In one example, the outer surface 42 comprises a textured surface. The textured surface reduces the contact surface area between the outer surface 42 of the lens 38 and droplets 62. This enables the droplet 62 to more easily slide off the lens 38. In one example, the textured surface comprises a plurality of protrusions or nibs 60 that extend outwardly from the outer surface 42 as shown in FIG. 4. The nibs 60 are discrete structures that are spaced apart from each other by a predetermined distance D. In one example, the nibs 60 comprise cylindrical bodies with a rounded top. In one example configuration, each nib has a 100 nm diameter and is 150 nm tall, and there is a 200 nm spacing between adjacent nibs 60. This is just one example configuration, and other configurations could also be used in light of different styling or operating conditions. In one general example, the spacing between the nibs 60 is two times the diameter and is 1.3 times the height of the nib 60.

In one example, the nibs 60 cover an entirety of the outer surface 42 of the lens 38. As such, the nibs 60 cover the front face 48 and rear face 50 of each tooth 44, as well as, all of the flat surfaces 46 between the teeth 44. This reduces the contact area between the droplets 62 and the flat areas of the outer surface 42 (FIG. 4) such that water can be easily repelled. Further this geometry reduces dirt and grime build up.

In one example, the lens 38 is over-molded onto the lights 36 and circuit board 34 and the over-mold includes the sawtooth profile. In another example, the sawtooth profile is molded as a separate component, which is then insert molded with a remaining portion of the lens 38 over the lights 36 and circuit board 34.

The subject invention provides ground effect lighting that uses a combination of unique mechanical geometry and materials to keep the lens 38 clean. The sawtooth profile maximizes light output and performance while protecting light emitting surfaces from impacting debris. The textured surface of the lens 38 reduces the contact surface between the lens 38 and droplets, which significantly reduces surface energy to enable the droplets to slide off of the outer surface. Further, the printed circuit board 34 is located in the center of the light assembly 30, between the base 32 and lens 38, to improve flexibility so that when struck by larger objects, the board 34 can flex and absorb the impact. The optics and area of over molding can also be customized to display a logo (solid and not translucent over mold in defined areas), strobe (for rider guidance), messaging (advertisements, warnings, etc.), and/or to display various colors.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. An apparatus, comprising:
   a base supporting a printed circuit board;
   a plurality of lights connected to the printed circuit board; and
   a lens covering the lights to provide a light assembly, wherein the lens includes an outer surface having a sawtooth profile that includes a plurality of teeth that are spaced apart from each other by flat surfaces, and wherein each light is generally aligned to correspond with a flat surface between adjacent teeth, and wherein the outer surface comprises a textured surface.

2. The apparatus according to claim 1 wherein the textured surface comprises a plurality of nibs that are discrete from each other and that protrude outwardly from an outer tooth surface of the lens.

3. The apparatus according to claim 1 wherein the lens is comprised of a polypropylene/TPO resin material that is molded over the lights and printed circuit board.

4. The apparatus according to claim 1 wherein each tooth includes a front face that faces a vehicle forward direction and a rear face that faces a vehicle rearward direction, and wherein the front face extends from a first location at the flat surface to second location at a distal tip and the rear face extends from the distal tip to the flat surface to form one tooth, and wherein the front face slants in a rearward direction such that the second location is rearward of the first location, and wherein the rear face is perpendicular to the flat surface.

5. The apparatus according to claim 1, wherein the plurality of lights are directly molded and embedded within a material that forms the lens.

6. The apparatus according to claim 1 wherein the light assembly is attached to a vehicle mount structure such that light from the light assembly is directed toward ground level.

7. The apparatus according to claim 6 wherein the vehicle mount structure comprises a rocker panel, and wherein the light assembly is mounted on a ground facing surface of the rocker panel.

8. An illumination system for a vehicle, comprising:
   a vehicle mount structure configured for attachment to the vehicle;
   a light source fixed to the vehicle mount structure to direct light toward ground level wherein the light source comprises a plurality of lights; and
   a lens covering the light source, wherein the lens includes an outer surface having a sawtooth profile that includes a plurality of teeth that are spaced apart from each other by flat surfaces, and wherein each light is generally aligned to correspond with a flat surface between adjacent teeth.

9. The illumination system according to claim 8 wherein the lens is comprised of a polypropylene/TPO resin material.

10. The illumination system according to claim 8 including a base layer and a printed circuit board fixed to the base layer, and wherein the plurality of lights that are attached to the printed circuit board, and wherein the lens is molded over the lights.

11. The illumination system according to claim 8 wherein the vehicle mount structure comprises a rocker panel, and including a base to which the light source and lens are attached to form a light assembly, and wherein the light assembly is mounted on a ground facing surface of the rocker panel.

12. The illumination system according to claim 8, wherein the plurality of lights are directly molded and embedded within a material that forms the lens.

13. The illumination system according to claim 8, wherein each tooth includes a front face that faces a vehicle forward direction and a rear face that faces a vehicle rearward direction, and wherein the front face is slanted relative to the rear face.

14. The illumination system according to claim 13, wherein the front face extends from a first location at the flat surface to second location at a distal tip and the rear face extends from the distal tip to the flat surface to form one tooth, and wherein the front face slants in a rearward direction such that the second location is rearward of the first location.

15. The illumination system according to claim 13 wherein the rear face is perpendicular to the flat surface.

16. The illumination system according to claim 8 wherein the outer surface of the plurality of teeth comprises a textured surface that protrudes outwardly of the outer surface of each tooth.

17. The illumination system according to claim 16 wherein the textured surface comprises a plurality of nibs protruding outwardly from the outer surface of the plurality of teeth, and wherein the plurality of nibs are discrete from each other.

18. The illumination system according to claim 17 wherein the nibs are spaced apart from each other by a predetermined distance and cover an entirety of the outer surface of the lens.

19. A method comprising:
- fixing a light assembly to a ground facing surface of a rocker panel to provide ground effect lighting;
- providing the light assembly with a plurality of lights and a lens that has an outer surface having a sawtooth profile that includes a plurality of teeth that are spaced apart from each other by flat surfaces; and
- aligning each light to correspond with a flat surface between adjacent teeth.

20. The method according to claim 19, including providing the outer surface of the plurality of teeth as a textured surface that covers an entirety of the lens, wherein the textured surface comprises a plurality of discrete protrusions that extend outwardly from the outer surface of each tooth surface.

21. The method according to claim 19, including forming the lens from a polypropylene/TPO resin material that is molded over lights of the light assembly.

22. The method according to claim 19, including insert molding or over-molding the plurality of lights within a material that forms the lens such that the plurality of lights are embedded within the material.

23. The method according to claim 19, including forming a textured surface on the outer surface of the teeth, wherein the textured surface comprises a plurality of discrete protrusions that extend outwardly from each outer tooth surface.

* * * * *